May 22, 1951  H. B. GOODING  2,553,761
ADJUSTING DEVICE FOR CUTTING TOOLS
Filed May 3, 1948
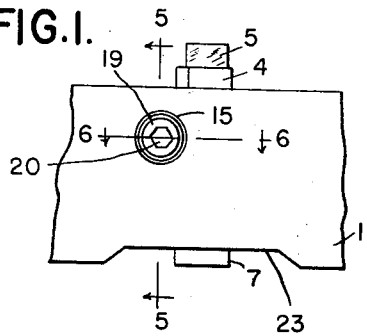
FIG. 1.
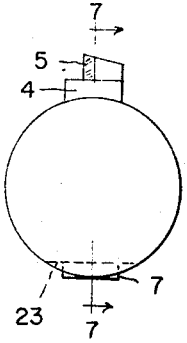
FIG. 4.
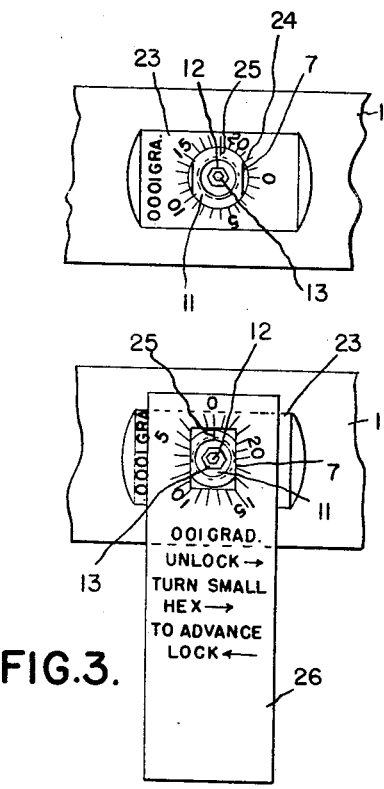
FIG. 2.
FIG. 3.
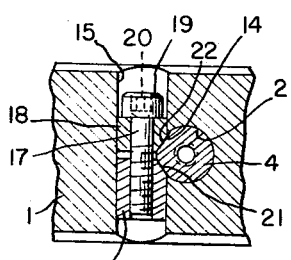
FIG. 6.
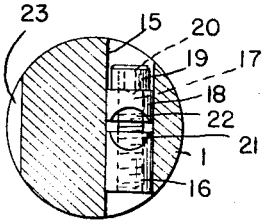
FIG. 5.
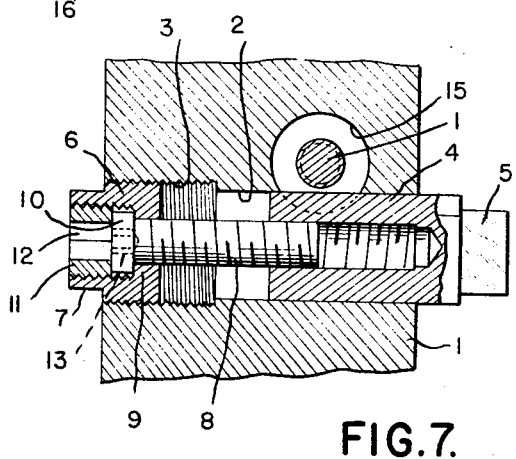
FIG. 7.
*INVENTOR.*
HAROLD B. GOODING
BY
*ATTORNEYS*

Patented May 22, 1951

2,553,761

UNITED STATES PATENT OFFICE 2,553,761

ADJUSTING DEVICE FOR CUTTING TOOLS

Harold B. Gooding, Ferndale, Mich., assignor, by mesne assignments, to Sheldrick Manufacturing Company, Upper Sandusky, Ohio, a corporation of Michigan Application May 3, 1948, Serial No. 24,863

6 Claims. (Cl. 29—96)

The invention relates to cutting tools and refers more particularly to adjusting devices for cutting tools.

The invention has for one of its objects to provide an improved adjusting device constructed to adjust the cutting element through very small predetermined increments.

The invention has for other objects to provide an improved adjusting device constructed to adjust the cutting element through a relatively large range; to so construct the adjusting device that certain of its parts may be disconnected so that rough adjustment of the cutting element may be quickly made and then these parts locked together for carrying out the fine adjustment of the cutting element; and to so construct the adjusting device that it may be economically manufactured by forming the body element with a cylindrical recess for slideably receiving the nut carrying the cutting element and by providing means on the body element for angularly positioning the nut in the recess and also locking the nut in an adjusted position.

With these as well as other objects in view the invention resides in the novel features of construction and combinations and arrangements of parts as more fully hereinafter set forth.

In the drawings:

Figures 1 and 2 are side elevations at right angles to each other of an adjusting device embodying the invention;

Figure 3 is a view similar to Figure 2 additionally showing a wrench used during the rough adjustment of the cutting element;

Figure 4 is an end view of Figure 1;

Figures 5 and 6 are cross sections on the lines 5—5 and 6—6 respectively of Figure 1; and Figure 7 is an enlarged cross section on the line 7—7 of Figure 4.

As illustrated in the present instance, the adjusting device is for use in a boring bar although it is apparent that it is applicable to other cutting tools. 1 is the body element which in the present instance is the body of a boring bar. This body element has the cylindrical recess 2 open at one side of the body element and the substantially axially aligned internally threaded recess 3 open at the opposite side of the body element and communicating with the cylindrical recess. 4 is a nut longitudinally slideable in the cylindrical recess and carrying at its outer end the cutting element or tip 5. 6 is a cup-shaped screw threadedly engaging the internally threaded recess 3 and having at its outer end the diametrically opposite flat sides 7. 8 is a second smaller screw in substantially axial alignment with the screw 6 and the nut 4 and swiveled in the former and threadedly engaging the latter. This second screw is journalled in the bottom 9 of the screw 6 and has the head 10 at its outer end located within the screw 6. The screws have differential threads engaging the body element and nut, these threads differing in pitch. In the present instance, both screws are right hand and the screw 6 has thirty-nine threads per inch and the screw 8 has forty-one threads per inch.

For the purpose of locking the screws 6 and 8 together the externally threaded locking element 11 is provided within and threadedly engaging the screw 6. This locking element is in substantially axial alignment with the screws and has the central polygonal wrench receiving socket 12 in the nature of an opening extending therethrough and larger than the central polygonal wrench receiving socket 13 in the head 10.

To angularly position the nut 4 in the body element 1, the nut is formed with the converging flat sides 14 which extend into the bore 15 in the body element 1 extending at right angles to the axis of the nut. 16 is an internally threaded member or nut sleeved within the bore and 17 is a screw also within the bore and threadedly engaging the member 16. 18 is a member sleeved on the screw and abutting its head 19 which is provided with the polygonal wrench receiving socket 20 preferably the same size as the polygonal socket 12. The member 16 and sleeve 18 are formed with the bevelled flat faces 21 and 22 respectively of the same inclination as the flat faces 14 of the nut 4 which serve to angularly position the nut 4 in the body element to always maintain the cutting edge of the cutting element 5 in the same plane and further serve to clamp the nut 4 in its position of longitudinal adjustment.

The portion of the body element 1 at the side of the screw 6 is provided with the flat face 23 having the annular series of graduations 24 encircling the recess receiving the screw and the screw is provided with the mark 25 for cooperating with the graduations when rotating the screw to secure a predetermined fine adjustment of the cutting element.

With the above construction, the nut 4 carrying the cutting element 5 may be roughly adjusted to approximately predetermined position independently of the screw 6 by unscrewing the locking element 11 after the screw 17 has been unscrewed and by then turning the screw 8 by a wrench inserted in the socket 13. During this rough adjustment the locking element 11 can act as an abutment against the head 10 of the screw to assure the longitudinal adjustment of the nut 4. Also during this rough adjustment the screw 6 is held from rotation by suitable means, such as the wrench 26, engaging the flat sides at the outer end of the screw 6. After the rough adjustment has been effected, the locking element 11 can then be tightened down against the head 10 of the screw 8 to lock the screw 8 to the screw 6, this being accomplished by a wrench in the socket 12 of the locking element. After the locking the desired fine adjustment can be accomplished by turning the screw 6 through the locking element 11 by means of the wrench engaging the socket 12 and the adjustment controlled by turning the mark 25 to the desired graduation 24. The screw 17 may then be tightened up to assure accurate angular positioning of the nut 4 and also to clamp this nut in its adjusted position.

From the above description, it will be seen that by reason of the body element 1 having a cylindrical recess for slideably receiving the nut 4 carrying the cutting element 5 the structure may be more economically manufactured than one in which the nut receiving recess is polygonal. Also by reason of the adjusting screw 8 being adjustable independently of the adjusting screw 6, the cutting element 5 may be adjusted through a relatively large range.

What I claim as my invention is:

1. An adjusting device for a cutting tool comprising a body element, a screw threadedly engaging said body element, a nut movable relative to said body element, a cutting element on said nut, a screw rotatable relative to said first mentioned screw and threadedly engaging said nut, and means for locking said second mentioned screw to said first mentioned screw whereby said second mentioned screw is rotatable with said first mentioned screw.

2. An adjusting device for a cutting tool comprising a body element, a nut movable relative to said body element, a cutting element on said nut, a screw threadedly engaging said nut, a second screw rotatable relative to and substantially axially aligned with said first mentioned screw and threadedly engaging said body element, said screws having their threads differing in pitch and means for locking said screws directly to each other to turn in unison.

3. An adjusting device for a cutting tool comprising a body element having a cylindrical recess, a nut slideable in said recess, means on said body element for angularly positioning said nut in said recess, a cutting element carried by said nut, a screw in substantially axial alignment with and threadedly engaging said nut, a second screw in substantially axial alignment with and rotatable relative to said first mentioned screw, said screws having their threads differing in pitch and means threadedly engaging one of said screws for locking said screws together to turn in unison.

4. An adjusting device for a cutting tool comprising a body element, a screw threadedly engaging said body element, a nut slideably engaging said body element, a cutting element on said nut, a screw in substantially axial alignment with and rotatable relative to said first mentioned screw and threadedly engaging said nut, said second mentioned screw having a head within said first mentioned screw provided with a polygonal socket and a locking element within and threadedly engaging said first mentioned screw and adapted to abut said head, said locking element having a polygonal opening therethrough in substantially axial alignment with the socket in said head.

5. An adjusting device for a cutting tool comprising a body element, a screw threadedly engaging said body element, a nut movable relative to said body element, a cutting element on said nut, a screw in substantially axial alignment with and swiveled in said first mentioned screw and threadedly engaging said nut, said screws having their threads differing in pitch, and an element for locking said screws together to turn together.

6. An adjusting device for a cutting tool comprising a body element having a cylindrical recess, a nut slideable in said recess, a cutting element on said nut, a screw threadedly engaging said body element, a second screw swiveled in said first mentioned screw and threadedly engaging said nut, means for locking said screws together to turn in unison and means for angularly positioning said nut in said recess and locking said nut in an adjusted position.

HAROLD B. GOODING.

REFERENCES CITED

The following references are of record in the file of this patent:

UNITED STATES PATENTS

| Number | Name | Date |
|---|---|---|
| 1,482,916 | Dugar | Feb. 5, 1924 |
| 2,227,085 | Hassig | Dec. 31, 1940 |
| 2,274,244 | Miller | Feb. 24, 1942 |
| 2,390,967 | Swensen et al. | Dec. 11, 1945 |